May 15, 1956     F. B. SYLVANDER     2,745,996
NULL SEEKING SYSTEM
Filed Aug. 23, 1952
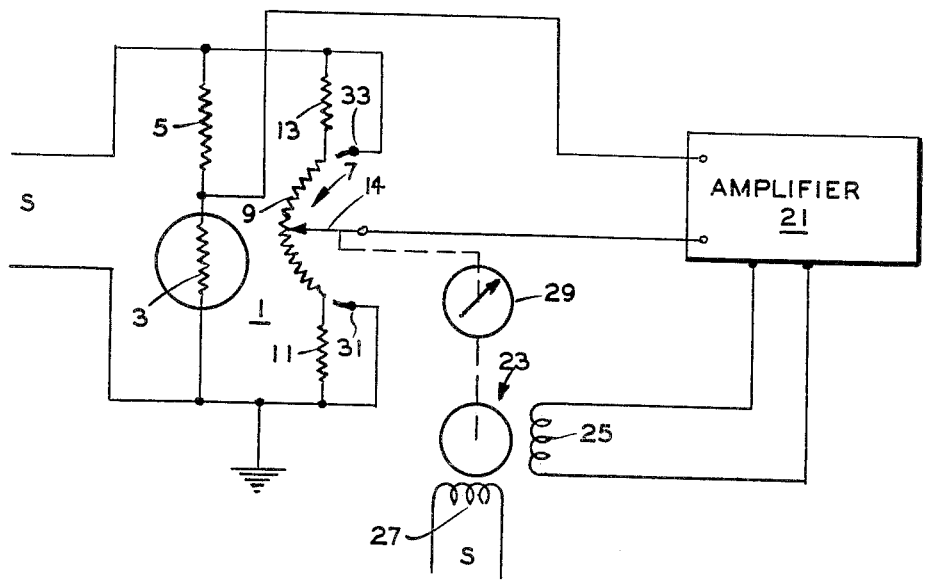
INVENTOR.
FREDERICK B. SYLVANDER
BY
*S.H.Hartz*
ATTORNEY

United States Patent Office 2,745,996
Patented May 15, 1956

2,745,996

NULL SEEKING SYSTEM

Frederick B. Sylvander, Ridgewood, N. J., assignor to Bendix Aviation Corporation, Teterboro, N. J., a corporation of Delaware Application August 23, 1952, Serial No. 305,938

6 Claims. (Cl. 318—29)

The invention relates to null seeking systems and more particularly to control systems of the kind having an element sensitive to a condition for providing signals corresponding to the condition and a follow-up for nullifying the signals.

In systems of this kind used heretofore, the follow-up may comprise a potentiometer having a wiper slidable on a resistor. If the wiper is moved beyond the ends of the potentiometer resistor the system is inoperative until the wiper is returned to contact the resistor. This difficulty is sometimes overcome by using positive stops or by using a system of limit switches to prevent the wiper from disengaging the resistor. The positive stops may cause excessive force to be exerted on the potentiometer wiper and associated structure and the limit switches require additional components and space for the switches and components.

One object of the present invention is to provide a null seeking system including a potentiometer wherein the wiper may move beyond the ends of the resistor and is automatically returned to engagement with the resistor without the use of switches or other space consuming components.

Another object is to provide a null seeking system in which the potentiometer wiper operates in the manner described and which is compact and simple in operation.

Another object is to warn the operator when a fault occurs in the system or the system is operating in a condition beyond the normal range of operation.

The invention contemplates a bridge circuit adapted to be connected to a power source for providing signals corresponding to a condition, the bridge circuit comprising an element responsive to the condition in one of its legs, a potentiometer including a resistor in another two of its legs and a wiper movable relative to the resistor in response to the signals for balancing the bridge upon a change in the condition, and means operative upon overtravel of the wiper to open-circuit position to restore the wiper to engagement with said resistor, comprising an element engageable by the wiper connecting the wiper directly to the power source to provide signals for driving the wiper toward the resistor.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The single figure of the drawing shows a schematic wiring diagram of a null seeking system constructed according to the invention.

Referring now to the drawing for a more detailed description of the novel null seeking system of the present invention, the system comprises a bridge circuit 1 having a resistor 3 in one leg responsive to a condition, such as temperature. A fixed resistor 5 forms a second leg of the bridge and the other two legs of the bridge are formed by a resistor 9 of a potentiometer 7 and a pair of auxiliary resistors 11, 13 connected to the ends of resistor 9. A source of electric current "S" is connected across the bridge between resistors 5 and 13 and between resistors 3 and 11. Potentiometer 7 has a wiper arm 14 slidable on resistor 9, and when the bridge is unbalanced, a signal appears across the input of an amplifier 21 connected to bridge 1. A reversible two-phase motor 23 has one phase winding 25 connected to the output of amplifier 21 and a second-phase winding 27 connected to alternating current source "S." Motor 23 is drivably connected to wiper 14 of potentiometer 7 and to an indicator 29 for indicating the temperature of sensitive resistor 3.

When bridge 1 is unbalanced the signal from the bridge is amplified by amplifier 21 and drives motor 23 in one direction or the other, as determined by the phase of the signal. Wiper 14 is driven by motor 23 to balance the bridge and nullify the signal.

If sensitive resistor 3 is subjected to extreme high or low temperatures, or if resistor 3 is short-circuited, wiper 14 moves into engagement with elements 31, 33 as determined by the direction of movement of the wiper on resistor 9. Elements 31, 33 are connected to alternating power source "S" and when wiper 14 engages element 31, resistor 11 is by-passed and a signal provided for reversing the direction of rotation of motor 23 to drive the wiper toward resistor 9 and back into engagement with resistor 9. Also, when wiper 14 engages element 33, resistor 13 is by-passed and a signal is provided for reversing the direction of rotation of motor 23 to drive the wiper back into engagement with resistor 9. The wiper oscillates to and fro until the temperature is within the range for which the system is designed or until the fault in the system is corrected. This oscillates the pointer on indicator 29 and warns the operator that the indication is not correct. The system is not permanently disabled at extreme temperatures because wiper 14 is returned automatically to engagement with resistor 9 and the system operates normally when the temperature again returns to the operating range.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A bridge circuit adapted to be connected to a power source for providing signals corresponding to a condition, comprising an element sensitive to the condition in one of its legs, a potentiometer including a resistor in another two of its legs and a wiper movable relative to said resistor in response to the signals for balancing said bridge upon a change in the condition, and means operative upon over-travel of the wiper to open circuit position to restore the wiper to engagement with said resistor, comprising an element engageable by the wiper connecting said wiper directly to the power source to provide signals for driving the wiper toward the resistor.

2. A bridge circuit for providing signals corresponding to a condition and adapted to be connected to a power source, said circuit comprising a first resistor sensitive to a condition in one of its legs, a second resistor in another of its legs, and a potentiometer including a resistor in the remaining two of its legs and a wiper movable relative to said resistor in response to the signals for balancing the bridge upon a change in the condition, said two last-mentioned legs including resistors connected to the ends of said potentiometer resistor, and means operative upon over-travel of said wiper to open circuit position to restore the wiper to engagement with said resistor, comprising elements engaged by the wiper at the ends of its travel and each connected for by-passing a different one of the last-mentioned resistors.

3. A null seeking system of the class described, comprising a bridge circuit adapted to be energized by a power source for providing signals corresponding to a condition, including an element sensitive to the condition in one of its legs and a potentiometer including a resistor in another two of its legs, said potentiometer including a wiper movable relative to the associated resistor for balancing said bridge upon a change in the condition, a servomotor operatively associated with said bridge and responsive to the signals therefrom and drivably connected to said wiper, and means operative upon over-travel of said wiper to open circuit position to restore the wiper to engagement with said resistor, comprising contact means engaged by said wiper at the ends of its travel for connecting said wiper directly to the power source to provide signals for reversing rotation of said motor and for driving said wiper toward said resistor.

4. A null seeking system of the class described, comprising a bridge circuit for providing signals corresponding to a condition, including an element sensitive to the condition in one of its legs and a potentiometer including a resistor in another two of its legs, said two last-mentioned legs including a pair of resistors connected to the ends of the potentiometer resistor, said potentiometer including a wiper movable along the associated resistor for balancing said bridge upon a change in the condition, a servomotor operatively associated with said bridge and responsive to the signals therefrom and drivably connected to said wiper, arranged to drive said wiper to balanced position, and means operative upon over-travel of said wiper to open circuit position to restore the wiper to engagement with said resistor, comprising contact means engageable by said wiper at the ends of its travel and connected to said pair of resistors for by-passing one or the other of said resistors to provide signals for reversing rotation of said motor and for driving said wiper toward said resistor.

5. A null seeking system of the class described, comprising a bridge circuit for providing signals corresponding to a condition, including an element sensitive to the condition in one of its legs and a potentiometer including a resistor in another two of its legs, said two last-mentioned legs including a pair of resistors connected to the ends of said potentiometer resistor, a power source connected across said pair of resistors and said potentiometer resistor, said potentiometer including a wiper movable along the associated resistor for balancing said bridge upon a change in condition, a servomotor operatively associated with said bridge and responsive to the signals therefrom and drivably connected to said wiper for driving said wiper to balanced position, and means operative upon over-travel of said wiper to open circuit position to restore the wiper to engagement with said resistor, comprising contact means connected to the power source and engaged by said wiper at the ends of its travel for providing signals to reverse rotation of said motor and drive said wiper toward said resistor.

6. A null seeking system of the class described, comprising a normally balanced circuit including means sensitive to a condition for unbalancing the circuit and providing signals in response to a change in the condition, means in said circuit for re-balancing said circuit, a servomotor operatively associated with said balancing means and responsive to the signals from said circuit, and means operative upon over-travel of said balancing means to restore the wiper to engagement with said resistor, comprising means for reversing rotation of said motor when said balancing means reaches its limits to return said balancing means to normal operating position.

References Cited in the file of this patent

UNITED STATES PATENTS

| | | |
|---|---|---|
| 1,694,237 | Simonds | Dec. 4, 1928 |
| 2,412,263 | Hartig | Dec. 10, 1946 |
| 2,439,094 | Miles | Apr. 6, 1948 |
| 2,648,040 | Schneider | Aug. 4, 1953 |